United States Patent [19]

Kohaut

[11] 4,408,090

[45] Oct. 4, 1983

[54] TRIMLESS CARPET BASE INSERT DEVICE

[75] Inventor: John E. Kohaut, West Orange, N.J.

[73] Assignee: Raceway Components, Inc., Nutley, N.J.

[21] Appl. No.: 227,757

[22] Filed: Jan. 23, 1981

[51] Int. Cl.³ .............................................. H02G 3/28
[52] U.S. Cl. ........................................ 174/48; 52/221
[58] Field of Search ...................... 174/48, 49; 52/220, 52/221; 220/3.7

[56] References Cited

U.S. PATENT DOCUMENTS 3,932,696 1/1976 Fork et al. ............................ 174/48
4,041,238 8/1977 Penczak ................................ 174/48
4,178,469 12/1979 Fork ..................................... 174/48

Primary Examiner—A. T. Grimley
Assistant Examiner—D. A. Tone

Attorney, Agent, or Firm—Howard N. Sommers

[57] ABSTRACT

A trimless carpet base insert device, further provided with novel positioning and assembly features, enabling assembly and use thereof to be made in situ, by initially interlocking end members of the insert device with apertured portions of the cable raceway, thereby providing registration guide means for receiving and registering body portions of the insert device with said raceways, complementary interlocking means being provided on the body portion and end members. Thus the insert device body parts may be readily and compactly packaged and shipped and furnished to contractors and others in parts for ready assembly and installation in original building construction procedure or for subsequently positioning them as modules or units in openings formed in floors or other structural members.

7 Claims, 12 Drawing Figures

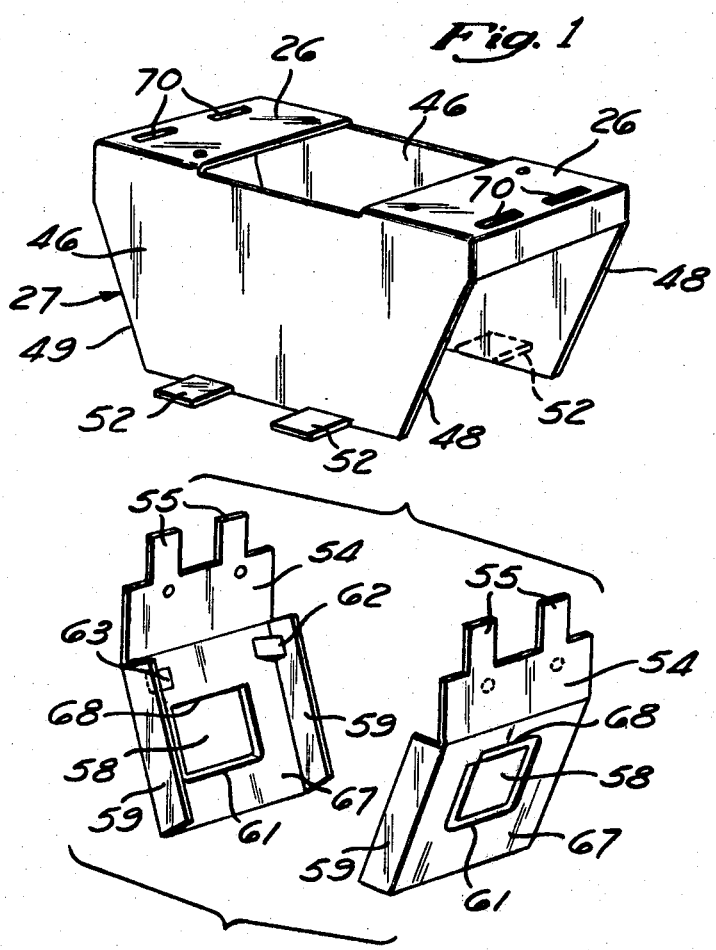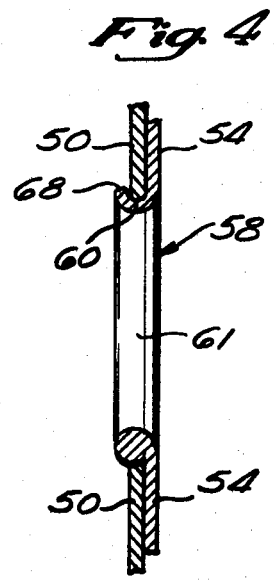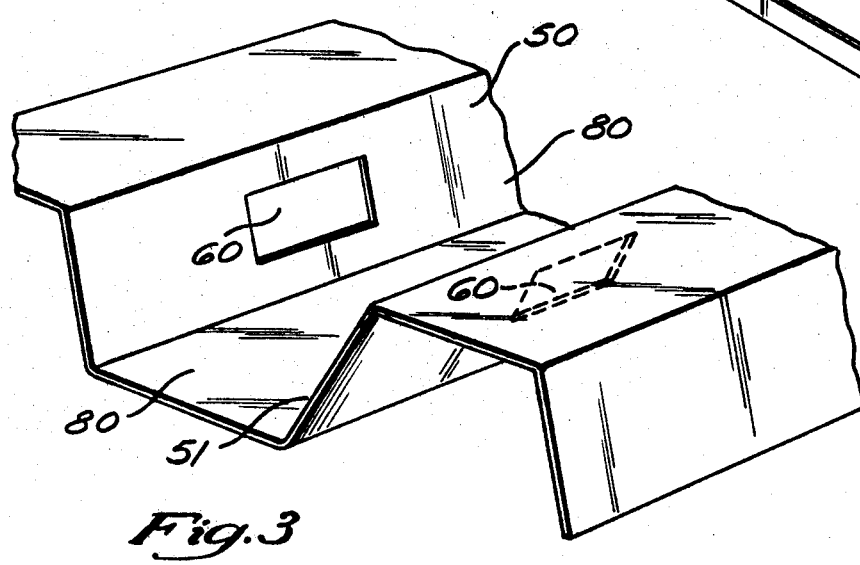

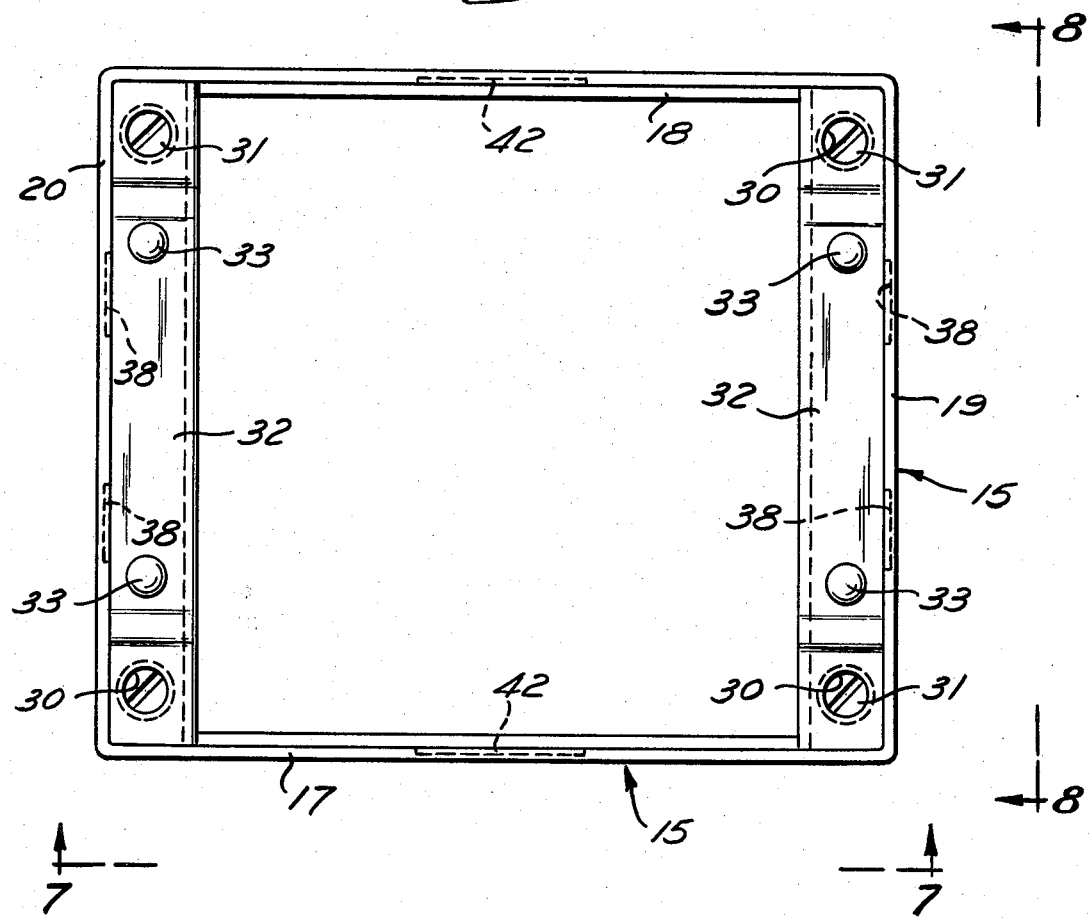

TRIMLESS CARPET BASE INSERT DEVICE

BACKGROUND AND OBJECTS OF THE INVENTION

Electrical insert devices are important to the construction industry, particularly in view of the expanding use of electrical equipment and accessories and the ensuing need for and desirability of installing more insert devices at plural stations. The cost of shipment of such devices from the manufacturer to the ultimate users, such as contractors and suppliers, and the cost of assembly and installation of such devices and the degree of reliability on assembly and use, are major factors in determining the use thereof. The invention disclosed herein fills the requirements mentioned by providing an insert device formed of parts which may be readily shipped in knock-down form, occupying a minimum of shipping space and which may be readily registered with and assembled into the cable raceways in accurate and reliable interlocking procedures, and which are efficient in use.

From the foregoing it will be noted that the insert device of the invention is provided with novel means facilitating assembly and installation thereof at the point of desired installation without the use of tools or fixtures, and enabling simple adjustment to conform precisely and accurately to the raceway or other opening wherein it is to be positioned and to readily register and interlock therewith.

DESCRIPTION OF THE DRAWINGS

The invention is exemplarily illustrated in the drawings, wherein similar reference characters indicate like parts, and wherein:

FIG. 1 is a schematic, isometric view of an insert device body member of the invention, FIG. 2 is a similar view of end closure members adapted to be used complementary to the body member pursuant to the invention, FIG. 3 is a fragmentary, perspective view of typical cable raceways in connection with which the invention may be used, said raceways being provided with cable passage openings, FIG. 4 is an enlarged, fragmentary, vertical elevational view of the insert device end portions registered and interlocked with edges of openings in the sides of cable raceways, FIG. 5 is a perspective view of a cover member for complementary frictional or other closing engagement with the upper end of the body member of the insert device, FIG. 11 is end elevational view thereof, taken at line 11—11 of FIG. 9 and FIG. 12 is a top plan view thereof taken at line 12—12 of FIG. 7.

DESCRIPTION OF EXEMPLARY FORMS OF THE INVENTION

Figure 6:
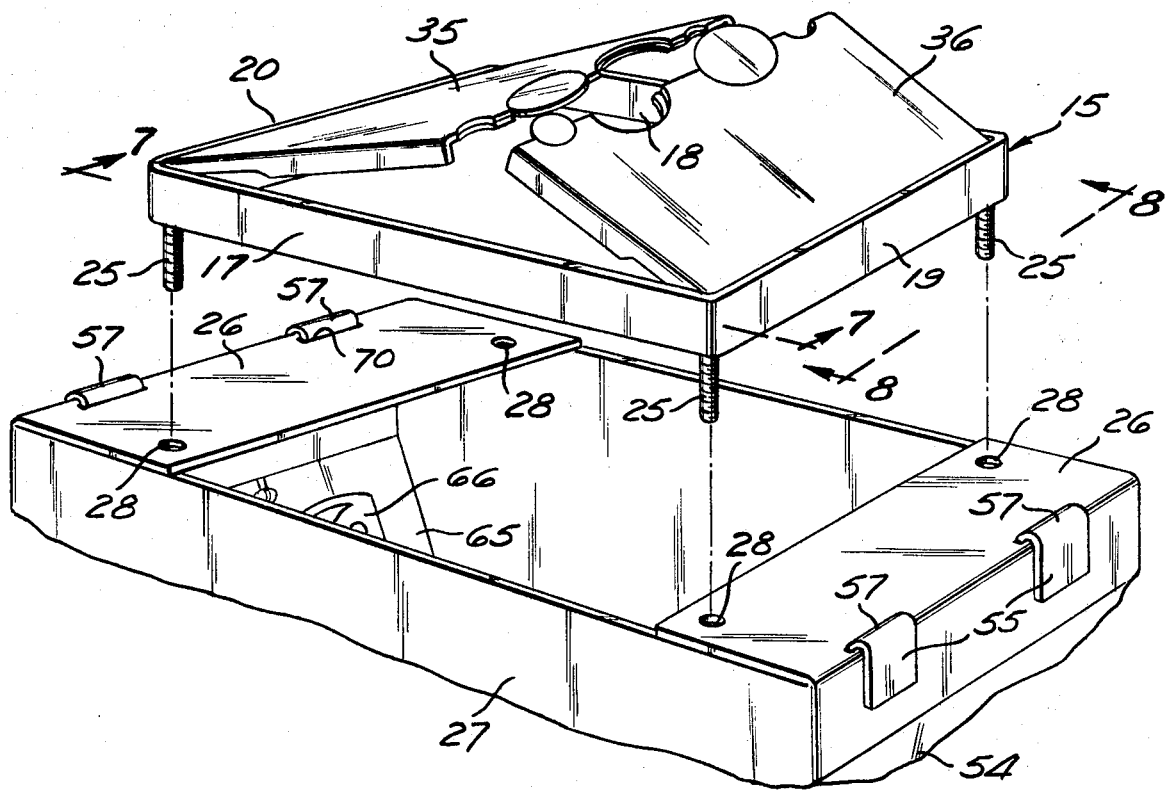
FIG. 6 is a fragmentary perspective view of a device embodying the invention, with the ring member thereof shown positioned for assembly and installation in line with the top of the insert device body.

The body member 27 (FIG. 1) of the insert device of the invention includes end members with angularly bent lower portions conforming with the openings 60 in cable raceway 80, the end members having apertured grommeted openings 58 (FIG. 4) for latching registration with the raceway cable openings 60. The end members 54 so latched to the cable raceways form registration guides for positioning the body member 27 between the end members. The insert device body member 27 includes a pair of side members 46 preferably downwardly inwardly tapered at their ends 48, 49 (FIG. 1) conforming to the contours 50, 51 (FIG. 3) of the raceway sides; said end members 54 may be provided with tongues 55 (FIG. 2) unitary therewith or separately formed and welded or otherwise secured to end members 54, and bendable upon themselves (FIG. 6) as shown at 57 and passed through apertures 70 at the upper end of plates 26 of body member 27, to position said end members on body member 27 in closing relation to the ends thereof. The end wall members, secured to the cable raceway, provide therebetween a tapered guide for entry of the insert body 27. The latter may have offset leg members 52 to register with the bottom of the raceway. End members 54 may (FIG. 2) be provided, in addition to the apertured grommeted portions 58 for passage of cables therethrough, with side flanges 59 for overlapping registration with the sides of the body member.

The insert device of this invention is further provided with means for snap-fitting, latching engagement with the raceway 80 or other cable passage apertures 60 (FIG. 3) such as a bracket 61, (FIGS. 2, 4) preferably of tubular cross-section secured to the outer surface of the lower portions 67 of end members 54 and marginally grommeting and framing cable passage apertures 58 (FIG. 2) of each end member. Said brackets, on registration extend inwardly of aperture 68, (FIG. 4) snapping into latching engagement with the apertured portions 60 in the side walls 50, 51 of raceway 80. The end members 54 thus interengage with the apertured side walls of the raceway, constituting registration guides for positioning the body member 27 therebetween at the desired cable-opening station, providing smooth, grommeted openings for passage of cables through the apertures 60 and 58 of the raceway and insert device. Further to that end the upper horizontal marginal edges defining apertured portions 58 of end members 54 are (FIG. 4) bent upon themselves inwardly upwardly, to define semi-circular inwardly extending lip portions 68 along the upper line of opening 58 the inner sides of the end wall or leg members 54. Thus the two end wall members (FIGS. 2, 3) are initially positioned in the raceway 80 with the lip portions 68 hooking inwardly of the apertures portions 60 of the raceway and with bracket 61 inwardly engaging the margins defining the raceway apertures 60.

Figure 7:
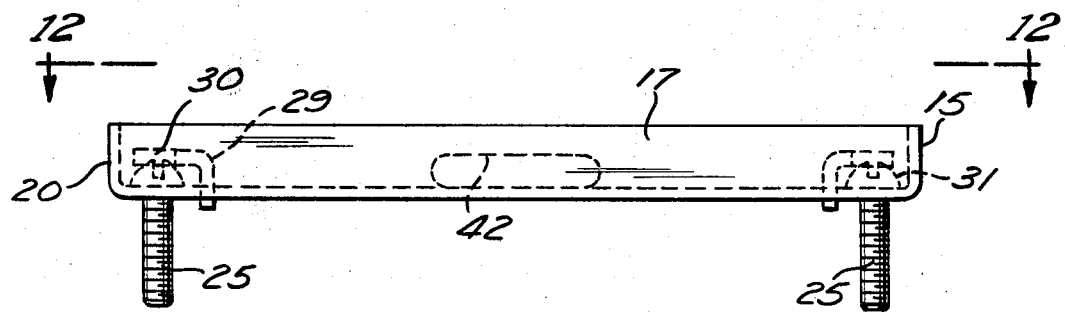
FIG. 7 is a side elevational view of the ring member, taken at line 7—7 of FIG. 6.
Figure 8:
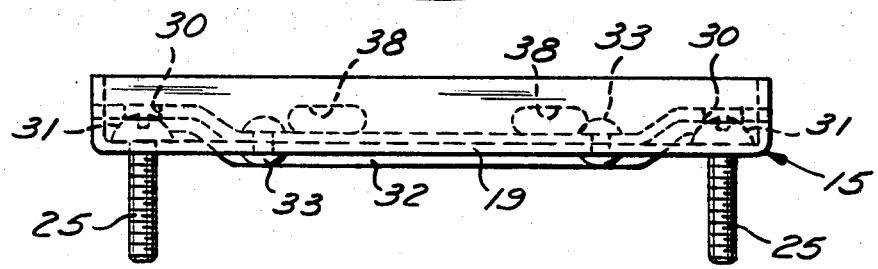
FIG. 8 is an end elevational view thereof, taken at 8—8 of FIG. 6.

Leveling ring 15 (FIGS. 6, 7, 8, and 12) which may be of rectangular or other form adapted for use in connection with the invention, has (FIG. 12) side members 17, 18 and end members 19, 20 and is preferably provided with means for captivating linkage means, such as (FIGS. 7, 8) bolts 25 or other means for connecting ring 15 to anchor flanges or plate portions 26 (FIGS. 6, 1) or other means at the upper end of the insert device body member 27, as by forming the bolts 25 and apertures 28 (FIG. 6) of plates portions 26 at the upper end of insert body member 27 complementarily threaded. Thus, on rotation of bolts 25, frame 15 may be leveled to conform precisely to the longitudinal and transverse floor level lines at the structural opening for the insert device 27.

Leveling ring 15 is provided with suitable means for captivating the bolts 25 therein, for example (FIG. 7) by providing corner brackets 29 formed in ring 15 in the initial fabrication of said ring, as by striking tongue members of the ring material or by forming said brackets as separate members 32 (FIG. 8) riveted as at 33 or welded to ring 15. Said brackets 29 are formed with circular or otherwise formed apertures 30 (FIG. 8) smaller than the head portions 31 of bolts 25, which may be slotted so that a flat key or tool, such as a screwdriver, may be positioned through said bracket apertures 30 and into registration with keyways in the head portions 31 of bolts 35. Thereby on rotation ring 15 will be moved to the precise leveling position desired. The position of ring 15 and bolts 25 captivated therein and engagable with threaded apertured plates 26 of body 27 of the insert device, enables further adjustable connection to be made to conform the position of the ring and insert device to varying depths and thicknesses of openings in the floors, in a simple and highly efficient manner.

Figure 9:
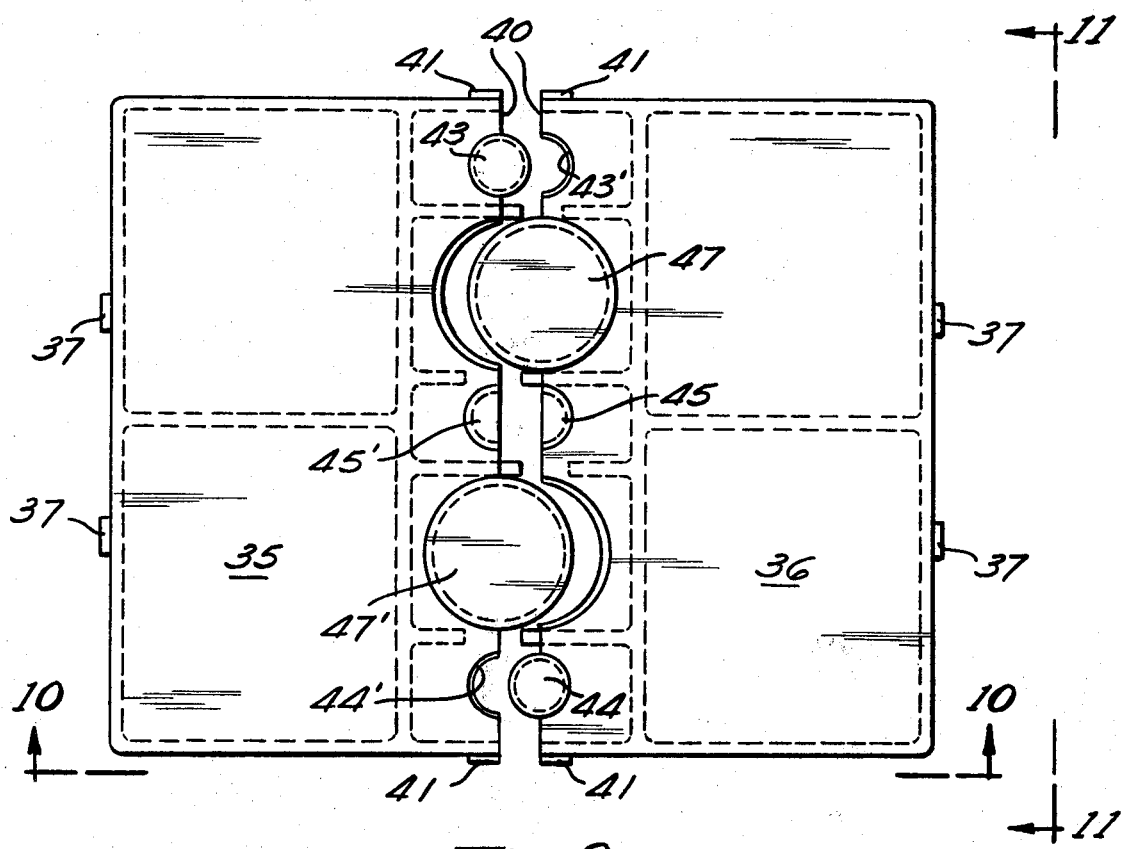
FIG. 9 is a top plan view of the cover members thereof as they would appear in (FIG. 6) partly open position.
Figure 10:
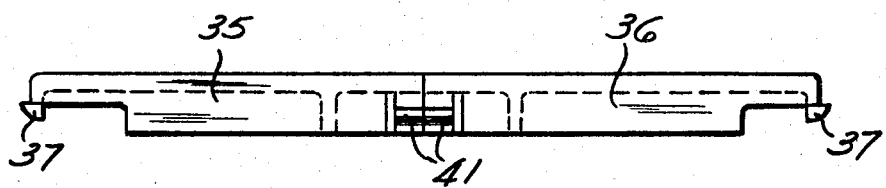
FIG. 10 is a side elevational view thereof, taken at line 10—10 of FIG. 9.

A pair of cover members 35, 36 (FIGS. 6, 9) are movably positioned in the ring 15, as by provided the cover members with end studs 37, (FIG. 9) for hinged positioning in complementary recesses 38 (FIG. 12) in the end members 19, 20 of leveling ring 15. The cover members 35, 36 may be provided with studs 41 (FIG. 9) at their sides for registration with recesses 42 (FIGS. 12 and 7) in side members 17 and 18 of ring member 15, so that on closing (FIG. 10) the cover members, their studs 41 will snap into recesses 42.

The ring or frame member 15 and cover members 35, 36 may be of plastic or other material, molded or otherwise formed as described. Cover members 35, 36 may (FIG. 9) be provided with knockouts 43, 44, 45 and 47 readily removable for passage of cables of varying diameter; such knockouts may be fully formed on one cover member and receivable in complementary recesses such as 43' 44' formed on the other cover member, or may be formed as complememtary halves, as shown at 45,45' (FIG. 9) on each cover members 35, 36.

As will be noted from the foregoing description of the invention and the drawings, the parts of the insert device of the invention, as shown in FIGS. 1, 2, 4, are easily installed in the field by hooking the upper edges 68 of end wall members 54 into openings 60 of the raceway sides 50, 51, and then snapping the bottom of bracket 61 into the aperture 60; the openings 60 of the raceway are thus grommeted. The installer may readily insert the body member 27 to the tapered guide formed by the two end wall members (previously snapped into registration with the raceway openings 60) and within the side flanges or rails 59 of the end wall members 54. The end wall members 54 may (FIG. 2) be provided with studs or protuberances 62, 63 spaced from the side flanges 59 of the end wall members 54, and formed unitarily or otherwise manufacture of the end wall members. The upstanding bosses or protuberances are spaced from the complementary to side flanges 59 to register and receive the side members 46 of body member 27 therebetween and reinforce the side members.

The tongues 55 of end members 54 (FIG. 1) pass through the openings 70 in the anchor plates 26 and are readily bent over by the operator and the parts and then (FIG. 6) effectively locked in position against accidental displacement in any direction, the cable passage openings being completely grommeted. Installation is thus achieved in the field without the use of tools or fixtures or accessory, bolting, or other connecting devices.

The insert device may (FIG. 6) be further provided with plate 65 therein on which a receptacle 66 may be suitably mounted and connected or suitably wired for connection of auxiliary devices, such as lamps, office equipment, etc. to the insert device interiorly. The insert device may be provided with partition means for separating different classes or types of cables, for example power and telephone lines, passing therethrough if desired.

The novel features of the insert device of the invention enable the parts thereof to be shipped in compact, knock-down form, and readily assembled in situ and inserted into the appropriate raceway station, registering and interlocking therewith, for passage of cables into or through the insert device. The insert device may be formed in preset form—that is, may be positioned in original floor, etc. construction wherein for example, a plywood, steel, etc. support form is provided and cement or other forming materials poured thereon and around the device. In such cases the top of the device may be closed by cap member 14 (FIG. 5) which may be removed when it is desired to activate the particular insert device station or location. The insert device may be used as an after-set device, that is, it may be positioned at an opening at a particular location in a (previously formed) continuous floor or other structural member by drilling or otherwise forming an opening in the structural member to receive the insert device therein.

The invention has been set forth above in terms of exemplary embodiments thereof; it is to be understood that variations will become apparent, in view of said disclosures herein, to those skilled in the art. The invention is to be broadly construed to cover such variations within the scope and spirit of the claims appended hereto.

I claim:

1. An assembly for providing passageways for access to cables in cells in a cellular raceway, which cellular raceway includes raceway sections comprised of opposed side walls of, and a floor section between, adjacent pairs of cells, each raceway section including a plurality of raceway sub-sections each having opposed access openings in the opposed cell side walls, each access opening having a perimeter, which assembly is adapted to form grommet-like surfaces about the perimeter of the opposed pair of access openings in a raceway sub-section, which assembly comprises:

(a) a frame member, having a passageway therein for passage of cables therethrough, and including means for positioning the frame member in one of the plurality of sub-sections of the raceway, adapted to generally complementarily register with the raceway sub-section, and further including means engagable generally complementarily with other means to form the assembly; and (b) a pair of end members, each adapted to be positioned in one of the plurality of raceway sub-sections, including means for forming a grommet-like surface about the perimeter in each of an opposed pair of access openings in the raceway sub-section, and means for interconnecting each side member to the frame member, adapted to be generally complementarily engagable with the engagable means of the frame member.

2. An assembly as in claim 1, further adapted to engage the opposed cell side walls at portions of the perimeter of the opposed pair of access openings, and in which each perimeter of each access opening includes a top sub-perimeter, and the surface forming means of each of the pair of end members include means defining an opening therein adapted to engage one of the opposed pair of side walls at the top sub-perimeter of one of the opposed pair of access openings in the raceway sub-section.

3. An assembly as in claim 1, in which the engagable means of the frame member comprise a slot adapted to receive a tab, and in which the interconnecting means in each of the pair of side members comprise a tab, insertable into and foldable over the slot in the frame member.

4. An assembly as in claim 1, in which the cellular raceway is adapted to form a section of a structural floor, and in which the assembly includes a top section, adapted to be aligned generally flush with the top of the structural floor, and a cover member, adapted to cover the top section of the assembly, comprising a pair of opposed side sections, movable to selectively open or close the top section, each side member including an edge portion adapted to generally abut the edge portion of the opposed side member when the side members are in covering relation to the top section, each side member abutting edge portion having a generally semi-circular opening therein, adapted to form a generally circular opening when the side members are in covering relation to the top section, and which cover member further includes a generally circular knockout member detachably connected to one of the generally semi-circular openings in one of the side members.

5. An assembly for providing passageways for access to cables in cells in a cellular raceway, which cellular raceway includes raceway sections comprised of opposed side walls of, and a floor section between, adjacent pairs of cells, each raceway section including a plurality of raceway sub-sections each having opposed access openings in the opposed cell side walls, each access opening having a perimeter, including a top sub-perimeter, which assembly is adapted to engage the opposed pair of side walls at the perimeter of the opposed pair of access openings in a raceway sub-section, which assembly comprises:

(a) a frame member, having a passageway therein for passage of cables therethrough, and including means for positioning the frame member in one of the plurality of sub-sections of the raceway, adapted to generally complementarily register with the raceway sub-section, and further including means engagable generally complementarily with other means to form the assembly; and (a) a pair of end members, each adapted to be positioned in one of the plurality of raceway-subsections, including means in each end member for engaging the opposed pair of side walls of the adjacent pair of cells at the top sub-perimeter of each of the opposed pair of access openings in the raceway sub-section, and means for interconnecting each side member to the frame member, adapted to be generally complementarily engagable with the engagable means of the frame member.

6. An assembly as in claim 5, in which the engagable means of the frame member comprise a slot adapted to receive a tab, and in which the interconnecting means in each of the pair of said members comprise a tab, insertable into and foldable over the slot in the frame member.

7. An assembly as in claim 5, in which the cellular raceway is adapted to form a section of a structural floor, and in which the assembly includes a top section, adapted to be aligned generally flush with the top of the structural floor, and a cover member, adapted to cover the top section of the assembly, comprising a pair of opposed side sections, movable to selectively open or close the top section, each side member includes an edge portion adapted to generally abut the edge portion of the opposed side member when the side members are in covering relation to the top section, each side member abutting edge portion having a generally semi-circular opening therein, adapted to form a generally circular opening when the side members are in covering relation to the top section, and which cover member further includes a generally circular knockout member detachably connected to one of the generally semi-circular openings in one of the side members.

* * * * *